US012607046B2

(12) United States Patent
Son et al.

(10) Patent No.: US 12,607,046 B2
(45) Date of Patent: Apr. 21, 2026

(54) VEHICLE LATCH WITH ADJUSTABLE OPENING SPEED

(71) Applicants: Hyundai Motor Company, Seoul (KR); Kia Corporation, Seoul (KR); DAEDONG DOOR Incorporated, Incheon (KR)

(72) Inventors: Jin Su Son, Incheon (KR); Sang Min Jeong, Incheon (KR); Duck Young Kim, Hwaseong-si (KR)

(73) Assignees: Hyundai Motor Company, Seoul (KR); Kia Corporation, Seoul (KR); Daedong Door Incorporated, Incheon (KR)

( * ) Notice: Subject to any disclaimer, the term of this patent is extended or adjusted under 35 U.S.C. 154(b) by 0 days.

(21) Appl. No.: 18/804,554

(22) Filed: Aug. 14, 2024

(65) Prior Publication Data

US 2025/0376879 A1 Dec. 11, 2025

(30) Foreign Application Priority Data

Jun. 11, 2024 (KR) ........................ 10-2024-0075674

(51) Int. Cl.

| | |
|---|---|
| ***E05B 81/06*** | (2014.01) |
| ***E05B 81/34*** | (2014.01) |
| ***E05B 81/46*** | (2014.01) |
| ***E05B 85/24*** | (2014.01) |

(52) U.S. Cl.

CPC .............. *E05B 81/46* (2013.01); *E05B 81/06* (2013.01); *E05B 81/34* (2013.01); *E05B 85/243* (2013.01)

(58) Field of Classification Search

CPC .......... E05B 81/46; E05B 81/06; E05B 81/34; E05B 85/243

See application file for complete search history.

(56) References Cited

U.S. PATENT DOCUMENTS

| | | | | |
|---|---|---|---|---|
| 12,345,077 | B2 * | 7/2025 | Cumbo .................. | E05B 85/02 |
| 2018/0073284 | A1 | 3/2018 | Im et al. | |
| 2019/0301212 | A1 | 10/2019 | Digel et al. | |
| 2022/0034129 | A1 | 2/2022 | Im et al. | |
| 2022/0186531 | A1 | 6/2022 | Janssen et al. | |
| 2024/0151073 | A1 | 5/2024 | Mozola et al. | |

FOREIGN PATENT DOCUMENTS

| | | | |
|---|---|---|---|
| KR | 20140059536 | A | 5/2014 |
| KR | 101836696 | B1 | 3/2018 |
| KR | 20210137619 | A | 11/2021 |

OTHER PUBLICATIONS

European Patent Office, extended European seach report, Application No. EP 24194218.4, Jan. 29, 2025, 8 pages.

* cited by examiner

*Primary Examiner* — Kristina R Fulton
*Assistant Examiner* — Thomas L Neubauer
(74) *Attorney, Agent, or Firm* — Slater Matsil, LLP

(57) ABSTRACT

A vehicle latch includes a catch which restricts or releases a striker disposed in a vehicle body, a pawl which comes into contact with one side of the catch to restrict rotation of the catch, a motor which transmits power to a link part, a worm gear engaged with the motor and rotated by operation of the motor, a cinching gear that is engaged with the worm gear, rotates in a direction opposite to that of the worm gear, and includes a protrusion formed to protrude from a front surface, and the link part of which one side is in contact with the protrusion and the other side is in contact with the catch to allow the catch to be rotated by rotation of the protrusion.

20 Claims, 8 Drawing Sheets

VEHICLE LATCH WITH ADJUSTABLE OPENING SPEED

CROSS-REFERENCE TO RELATED APPLICATION(S)

This application claims priority from Korean Patent Application No. 10-2024-0075674, filed on Jun. 11, 2024, in the Korean Intellectual Property Office, the disclosure of which is incorporated herein by reference in its entirety.

BACKGROUND

1. Field

Embodiments of the present disclosure relate to a vehicle latch with adjustable opening speed.

2. Description of Related Art

In general, a door latch configured to be locked with or released from a striker disposed in a vehicle body is installed in a door for opening or closing a vehicle. Specifically, a sedan is provided with a trunk room in which cargo may be loaded, and the trunk room is formed to be opened or closed by rotation of a trunk lid. Meanwhile, in sport utility vehicles (SUVs) and multi-purpose vehicles (MPVs), an opening is formed in the rear portion of a vehicle body such that cargo is easily loaded, and a tailgate is mounted to open or close the opening which is an entrance of a loading space.

That is, although sizes and shapes of trunk lids and tailgates are different, the trunk lid and the tailgate for a door for opening or closing a loading space of a vehicle are rotatably mounted on a vehicle body. In addition, the trunk lid and the tailgate have a latch in common to prevent the door from being opened during traveling or parking.

In the case of a tailgate latch installed to lock and release a tailgate, a problem of generating noise in an operation process has been continuously pointed out. This has problems that emotional quality of a vehicle may be degraded and wear may occur due to continuous friction.

Specifically, the reason why the noise is generated in the operation process of the tailgate latch has been known that vibrations and noise are generated when energy compressed by the tailgate is suddenly emitted because a structure in which a catch and a pawl are immediately released and opened by a reaction force of the vehicle in a process of opening the tailgate latch is formed. That is, the development of a vehicle latch capable of reducing opening noise of a tailgate in an operation process has been required in order to reduce noise.

The above description is to help understanding the technical background of the present disclosure. Accordingly, the above description should not be interpreted to reduce and limit the technical spirit of the present disclosure. In addition, the contents described or suggested in the above description do not necessarily mean the conventional technology. The above description may partially include contents that do not correspond to the conventional technology.

SUMMARY

Embodiments of the present disclosure are directed to providing a vehicle latch capable of preventing noise generation by adjusting an opening speed.

However, technical objectives to be solved through embodiments of the present disclosure are not limited to the above-described objectives, and other objectives which are not described above will be clearly understood by those skilled in the art to which the present disclosure belongs from the other descriptions such as detailed description of the specification.

According to one embodiment of the present disclosure, a vehicle latch includes a catch which restricts or releases a striker disposed in a vehicle body, a pawl which comes into contact with one side of the catch to restrict rotation of the catch, a motor which transmits power to a link part, a worm gear engaged with the motor and rotated by operation of the motor, a cinching gear that is engaged with the worm gear, rotates in a direction opposite to that of the worm gear, and includes a protrusion formed to protrude from a front surface of the cinching gear, and the link part of which one side is in contact with the protrusion and the other side is in contact with the catch to allow the catch to be rotated by rotation of the protrusion, wherein, in a process in which the catch is rotated such that a locked state is changed to an open state, the link part is contact-supported by one side of the catch, the catch is rotated by movement of the link part, and tailgate opening noise generation is suppressed.

DETAILED DESCRIPTION

Hereinafter, embodiments of the present disclosure will be described with reference to the accompanying drawings.

Following embodiments are provided to fully and completely transfer the technical spirit of the present disclosure to those skilled in the art to which the present disclosure belongs. Therefore, the technical disclosure of the present disclosure is not necessarily limited to the following embodiments. The present disclosure should be understood broadly to include various equivalents, alternatives, and modifications that implement the technical spirit which will be described below.

Terms used in the following description are used to fully and completely describe specific embodiments from the above-described viewpoint. Accordingly, the terms used in the following description should not be interpreted to reduce, limit, and restrict the technical spirit of the present disclosure and the like.

In the following description, terms such as “first” and “second” may be used to distinguish a specific component from other components. However, such terms are used for clarity of description only, and the technical spirit of the present disclosure should not be constructed as limited by such terms.

A singular expression includes a plural expression unless it is not clearly excluded in context. In addition, in the following description, the expression of "including" means the presence of the configurations, components, operations, features, steps, numbers, etc., described in the specification, and does not exclude addition of one or more other configurations, components, operations, features, steps, numbers, etc.

In the following description, directionally relative terms such as "beneath," "above," "lower," and "upper" may be used for facilitating understanding of components. However, such terms are provided for facilitating understanding of the present disclosure according to various operation states, use states, etc., of the present disclosure and should not be interpreted for reducing, limiting, or restricting the technical spirit of the present disclosure. For example, terms related to direction may be determined according to a relative point of view.

Meanwhile, each component illustrated in the accompanying drawings may be exaggerated or omitted for the sake of convenience and clarity of description.

Figure 1:
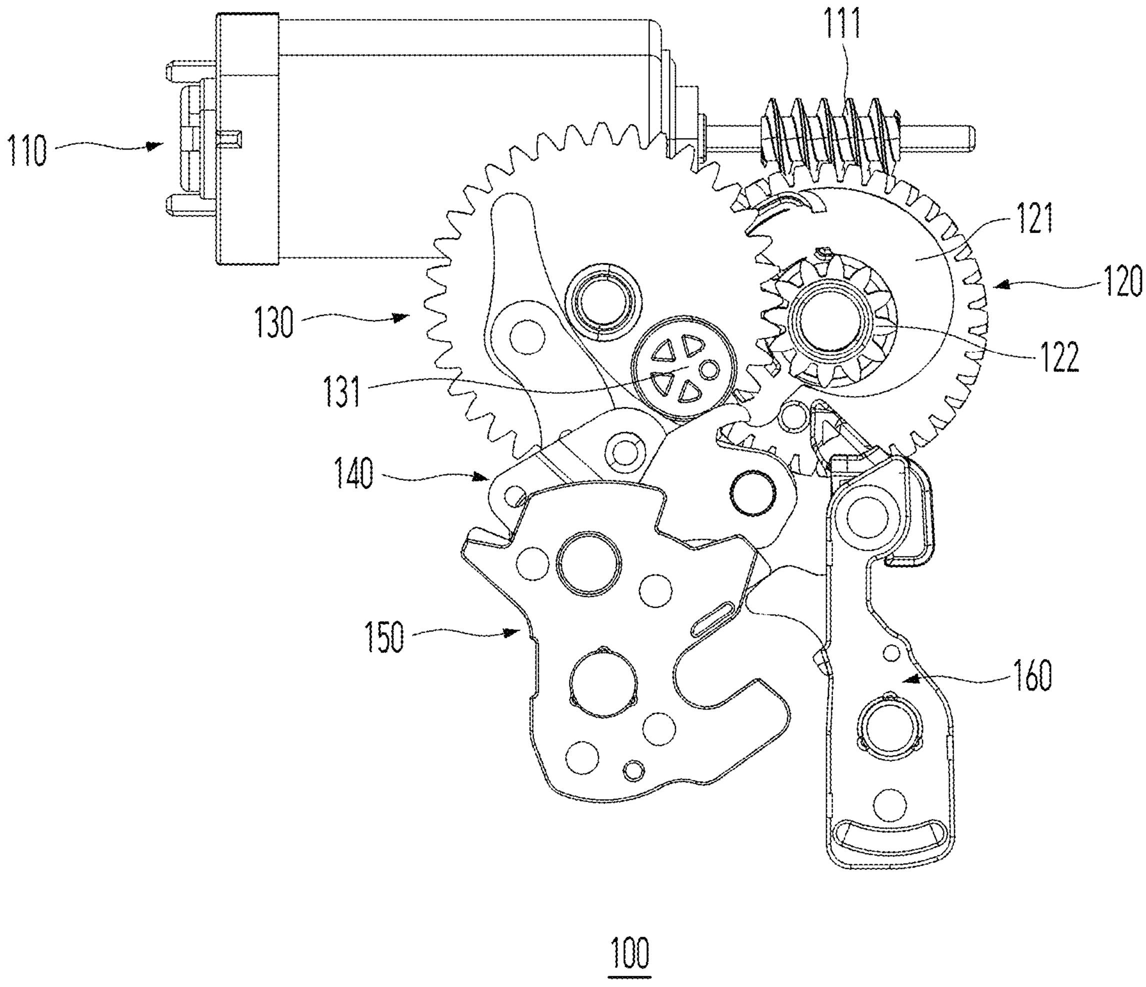
FIG. 1 is a schematic view illustrating an interior of a vehicle latch with adjustable opening speed according to one embodiment of the present disclosure.
Figure 2:
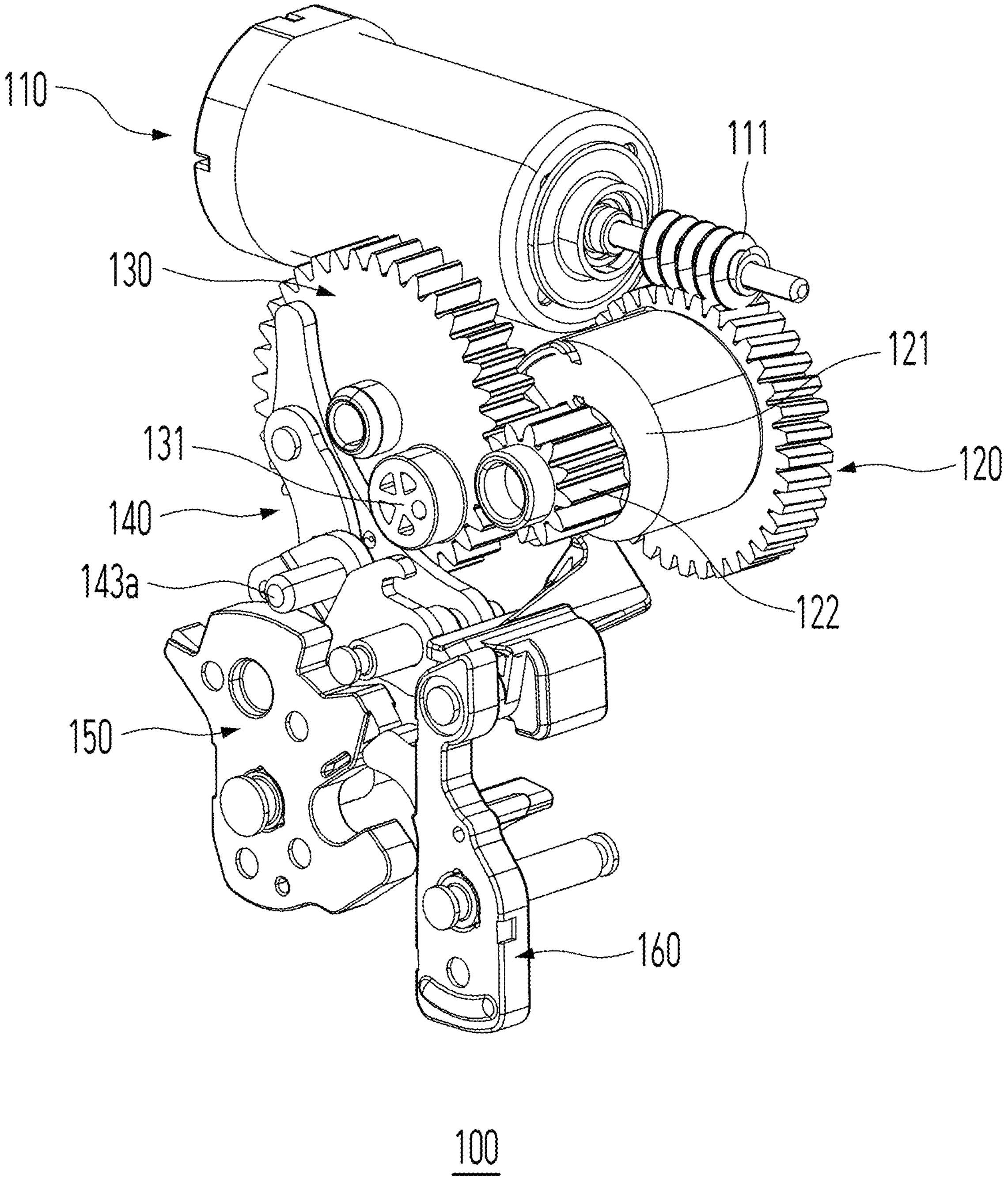
FIG. 2 is a perspective view illustrating the interior of the vehicle latch with adjustable opening speed illustrated in FIG. 1.
Figure 3:
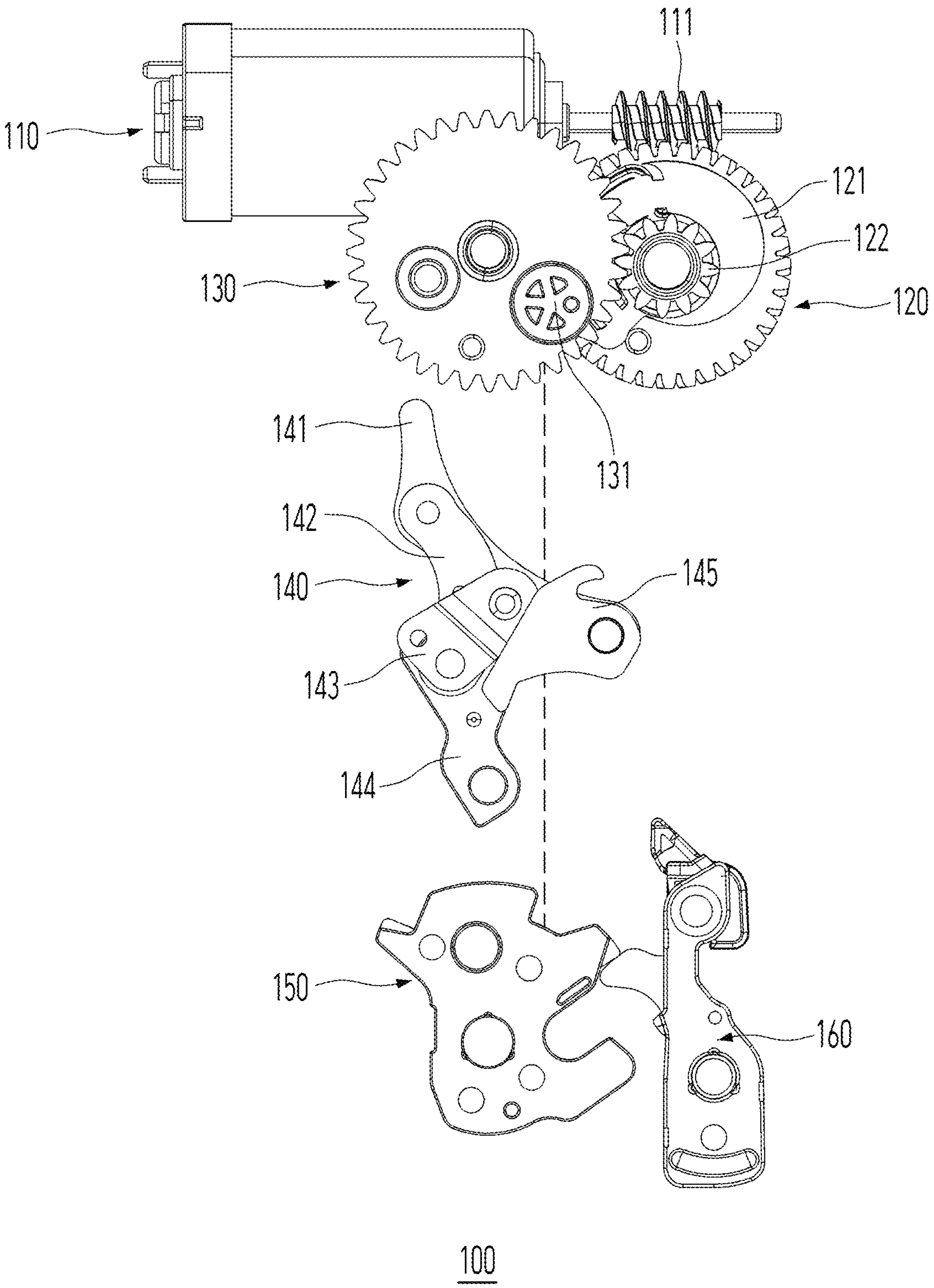
FIG. 3 is an exploded view illustrating the vehicle latch with adjustable opening speed illustrated in FIG. 1.

FIG. 1 is a schematic view illustrating an interior of a vehicle latch with adjustable opening speed according to one embodiment of the present disclosure, FIG. 2 is a perspective view illustrating the interior of the vehicle latch with adjustable opening speed illustrated in FIG. 1, and FIG. 3 is an exploded view illustrating the vehicle latch with adjustable opening speed illustrated in FIG. 1.

Referring to FIGS. 1 to 3, a vehicle latch 100 of the present embodiment may be disposed in a door of a vehicle and used to restrict a striker S provided in a vehicle body to maintain a state in which the door is locked. The vehicle latch 100 of the present disclosure may include a motor 110 and may be automatically operated by operation of the motor 110. Specifically, the vehicle latch 100 of the present embodiment may be applied to a tailgate. In addition, the vehicle latch 100 of the present disclosure has a feature of preventing tailgate opening noise by adjusting a speed at which a catch 150 rotates.

Specifically, in the vehicle latch 100, the catch 150 and a pawl 160 may restrict the striker S in the order of an open state, a first locked state, and a second locked state. The open state is a state in which the striker S is not inserted into the catch 150, the first locked state is a state in which the catch 150 rotates about half to restrict the striker S such that the door is not opened, and the second locked state is a state in which the catch 150 rotates completely to stably restrict the striker S.

Specifically, the vehicle latch 100 may include the motor 110 for generating power, a worm gear 120 engaged with the motor 110 and rotated by operation of the motor 110, a cinching gear 130 engaged with the worm gear 120 and rotated in a direction opposite to that of the worm gear 120, a link part 140 having one side in contact with the cinching gear 130 and the other side in contact with the catch 150, the catch 150 for restricting the striker S, and the pawl 160 for pressing the catch 150.

Hereinafter, each of the components will be described in more detail.

Figure 4:
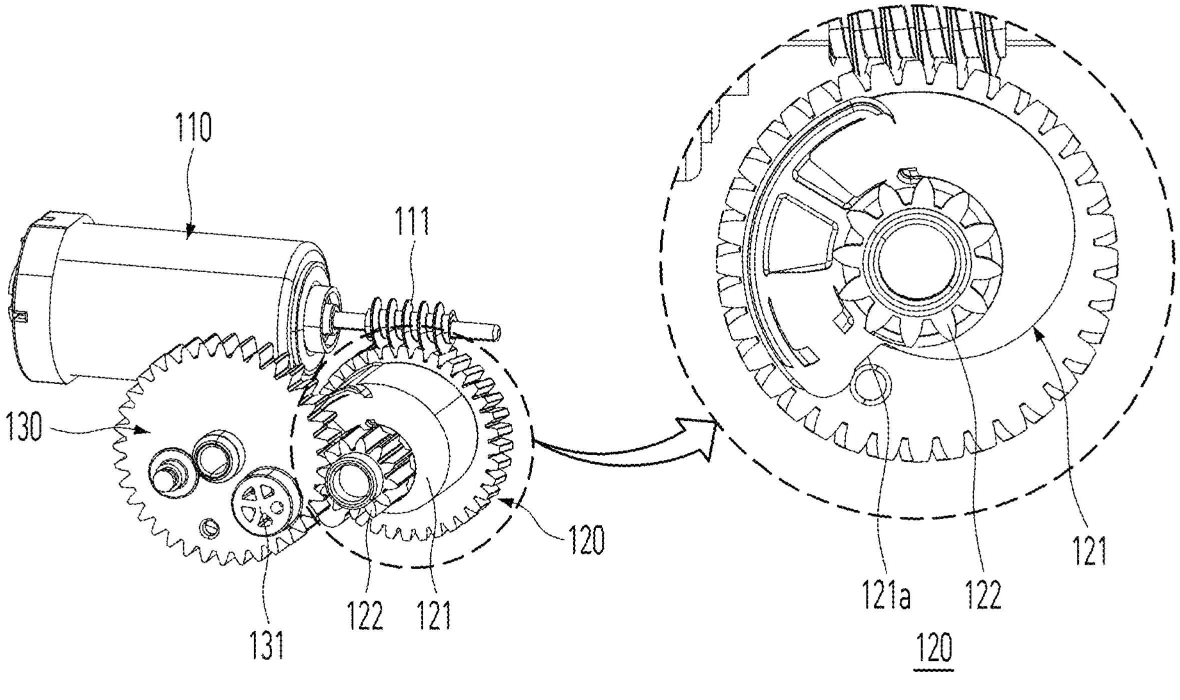
FIG. 4 is an enlarged view illustrating a motor, a worm gear, and a cinching gear illustrated in FIG. 1.

FIG. 4 is an enlarged view illustrating the motor, the worm gear, and the cinching gear illustrated in FIG. 1.

Further referring to FIG. 4, the motor 110 may be engaged with the worm gear 120 and transmit generated power to the worm gear 120. Specifically, the motor 110 may further include a worm 111 engaged with the worm gear 120.

The worm 111 may be disposed on an outer circumference of a shaft rotated by operation of the motor 110 and engaged with the worm gear 120. That is, the worm 111 may be rotated in a forward or reverse direction by operation of the motor 110 and may rotate the worm gear 120 engaged therewith.

Meanwhile, the worm gear 120 may be formed as a cylindrical member having an outer circumference on which sawteeth are formed, one side of the worm gear 120 may be engaged with the worm 111, and the other side may be engaged with the cinching gear 130. Preferably, the worm 111 may be engaged with an upper end of the outer circumference of the worm gear 120.

Specifically, the worm gear 120 may include a release part 121 which is formed by a protruding central portion of the worm gear 120 and of which the outer circumference is in contact with the pawl 160 and a central gear 122 formed by a protruding central portion of the release part 121 and engaged with the cinching gear 130.

The release part 121 may be formed as a member protruding from a central portion of the worm gear 120. Specifically, the release part 121 may be disposed to radially protrude from a center of the worm gear 120 and formed to protrude to be gradually away from the center of the worm gear 120. The pawl 160 is rotated in a state of being in contact with the outer circumference of the release part 121, and a rotation angle of the pawl 160 may be changed according to a distance from the center of the worm gear 120 to the outer circumference of the release part 121.

Specifically, the release part 121 may include a multi-end portion **121*a* on which steps are formed in a stepped manner. An example of the multi-end portion 121*a* may be a portion in which steps are formed in a stepped manner at a boundary between a portion at which a distance from the center of the worm gear 120 to the outer circumference of the release part 121 is shortest and a portion at which the distance is longest. Specifically, the multi-end portion 121*a* may push and rotate the pawl 160 according to rotation of the worm gear 120 to change a state in which the pawl 160 is in contact with the catch 150 to a state in which the pawl 160 is not in contact with the catch 150. Then, when the worm gear 120 rotates, the pawl 160 is moved along the outer circumference of the release part 121, and when the pawl 160 is disposed on a front end of the multi-end portion 121*a*, the pawl 160 may be rotated in a direction in which the catch 150** is disposed.

The central portion of the release part 121 may protrude in a forward direction to form the central gear 122, and sawteeth may be formed on an outer circumference of the central gear 122. The cinching gear 130 may be engaged with the outer circumference of the central gear 122. That is, the central gear 122 may be rotated according to rotation of the worm gear 120 and may rotate the cinching gear 130 engaged therewith in the direction opposite to that of the worm gear 120.

Since the release part 121 and the central gear 122 are disposed to protrude from the worm gear 120 in a stepped manner, the cinching gear 130 and the pawl 160 may operate smoothly without interfering with each other.

Meanwhile, like the worm gear 120, the cinching gear 130 may be formed as a cylindrical member on which sawteeth are formed on an outer circumference thereof. One side of the cinching gear 130 may be engaged with the worm gear 120, and the other side may be in contact with the link part 140. The cinching gear 130 may rotate in the direction opposite to that of the worm gear 120 and rotate the link part 140 which is contact-supported by the cinching gear 130.

Specifically, the cinching gear 130 may include a protrusion 131 protruding from a front surface of the cinching gear 130. Preferably, the protrusion 131 may be formed at one side of the cinching gear 130 to protrude in a cylindrical shape and may contact-support a first link part 141 of the link part 140 which will be described below. Specifically, the protrusion 131 may be rotated as the cinching gear 130 is rotated and may change an arrangement angle of the first link part 141 in contact therewith. That is, each of the components of the link part 140 may be systematically moved by the protrusion 131 of the cinching gear 130 to adjust a rotation angle of the catch 150.

Figure 5:
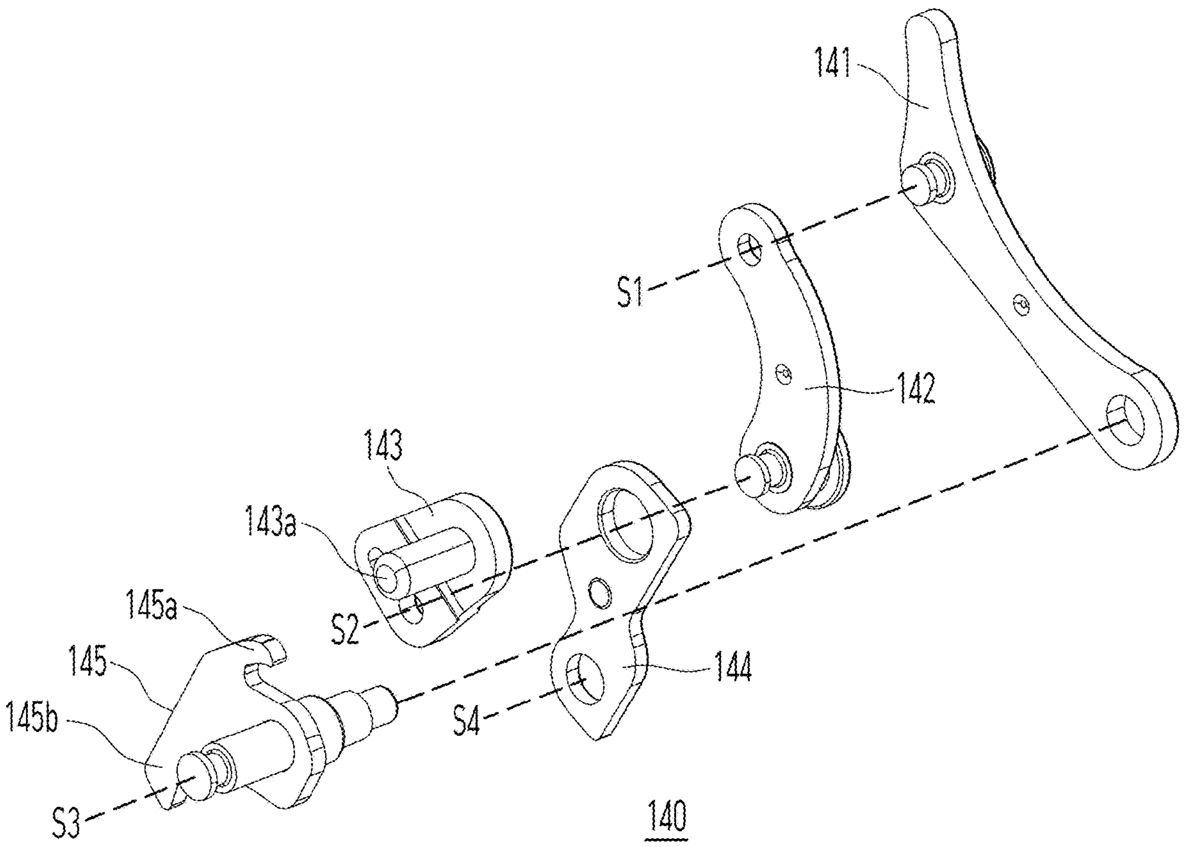
FIG. 5 is an exploded view illustrating a link part illustrated in FIG. 1.

Meanwhile, FIG. 5 is an exploded view illustrating the link part illustrated in FIG. 1.

Further referring to FIG. 5, one side of the link part 140 may be in contact with the protrusion 131, and the other side may be in contact with the catch 150. The link part 140 may be systematically rotated by rotation of the protrusion 131 and may rotate the catch 150. Specifically, the link part 140 has a series of structures for receiving power generated by the motor 110 and transmitting the power to the catch 150. The link part 140 may be contact-supported by one side of the catch 150 in a process in which the catch 150 rotates to change the locked state to the open state. As the link part 140 is moved, the catch 150 may be rotated, and tailgate opening noise generation may be suppressed.

Specifically, the link part 140 may include a first link part 141, a second link part 142, a third link part 143, a fourth link part 144, and an upward support 145 for moving a cinching pin 143*a* upward which are sequentially provided.

The first link part 141 may be disposed on an uppermost end of the link part 140 and selectively comes into contact with the protrusion 131 of the cinching gear 130. Specifically, the first link part 141 may be formed in a bar shape of which both ends are bent upward by predetermined extents. A third fixed shaft S3 may be disposed on a right end of the first link part 141, and the first link part 141 may rotate about the third fixed shaft S3. More specifically, when the protrusion 131 presses the first link part 141 downward, the first link part 141 may be rotated about the third fixed shaft S3 and moved downward. Then, when the first link part 141 is released from contact with the protrusion 131, the first link part 141 may rotate about the third fixed shaft S3 again and move upward. The third fixed shaft S3 may be fixedly disposed in a housing (not shown) in which the vehicle latch 100 is disposed.

The second link part 142 may be connected to one side of the first link part 141 to be rotatable about a first rotary shaft S1. Specifically, the second link part 142 may be formed in a plate type member formed to extend toward one side and disposed between the first link part 141 and the third link part 143. More specifically, the first rotary shaft S1 may be disposed between a center and a left end of the first link part 141 and connected to a leftmost end of the second link part 142.

Meanwhile, a right end of the second link part 142 may be connected to the third link part 143 through a second rotary shaft S2. That is, the second link part 142 may be moved upward or downward by rotation of the first link part 141 connected thereto through the first rotary shaft S1. Accordingly, an arrangement position and an angle of the third link part 143 connected to the second link part 142 may be changed.

One side of the third link part 143 may be rotatably connected to the second rotary shaft S2 of the second link part 142. Specifically, the third link part 143 may be formed as a plate type member having a unique shape and have one side connected to the second link part 142 through the second rotary shaft S2. Specifically, the third link part 143 may include the cinching pin 143*a* formed to protrude from a front surface of the third link part 143.

The cinching pin 143*a* may come into contact with and may be supported by a second protruding step 153 of the catch 150 while the catch 150 rotates to enter the first locked state from the second locked state. Specifically, while the second locked state of the catch 150 is changed to the first locked state, the second link part 142 and the third link part 143 which are connected may be sequentially moved by rotation of the first link part 141, and the cinching pin 143*a* may be moved at the same time and may come into contact with and be supported by the catch 150.

The cinching pin 143*a* may come into contact with and may be supported by the upward support 145 and released from contact with the catch 150 in a process in which the first locked state of the catch 150 is changed to the open state. That is, the cinching pin 143*a* may be disposed to prevent tailgate opening noise by supporting the catch 150 such that the catch 150 is not rotated immediately while the second locked state of the catch 150 is changed to the first locked state.

The fourth link part 144 may be formed as a plate type member and have one side connected to the second link part 142 and the third link part 143 through the second rotary shaft S2 and the other side connected to the catch 150 though a catch rotary shaft S4. The fourth link part 144 may rotate about the catch rotary shaft S4 to smoothly operate the link part 140 in a process in which the link part 140 operates.

The upward support 145 may be formed as a plate type member having a unique shape and have one side connected to the first link part 141 through the third fixed shaft S3. Specifically, the upward support 145 may be formed as the plate type member having a predetermined area and may have upper left and right sides formed to protrude toward both sides. The upward support 145 may be fixedly disposed without rotating and integrally formed in the housing (not shown) in which the vehicle latch 100 is disposed as necessary. Specifically, the upward support 145 may include a first hook 145*a* formed such that the upper right side of the upward support 145 protrudes and a second hook 145*b* formed such that the upper left side of the upward support 145 protrudes.

The first and second hooks 145*a* and 145*b* may be formed to protrude and extend at both upper sides of the upward support 145. Preferably, inclined surfaces may be formed on both ends of the first and second hooks 145*a* and 145*b* to be inclined downward by predetermined extents. Accordingly, the cinching pin 143*a* may smoothly move along the inclined surfaces of the first and second hooks 145*a* and 145*b*.

Specifically, when the first locked state is changed to the open state, the first and second hooks 145*a* and 145*b* may come into contact with a lower side of the cinching pin 143*a* to lift the cinching pin 143*a* upward. More specifically, the cinching pin 143*a* may come into contact with the first hook 145*a* first, move along an upper surface, and come into contact with the second hook 145*b* to move upward smoothly. Accordingly, the first and second hooks 145*a* and 145*b* may release contact between the catch 150 and the cinching pin 143*a* to rotate the catch 150.

Figure 6:
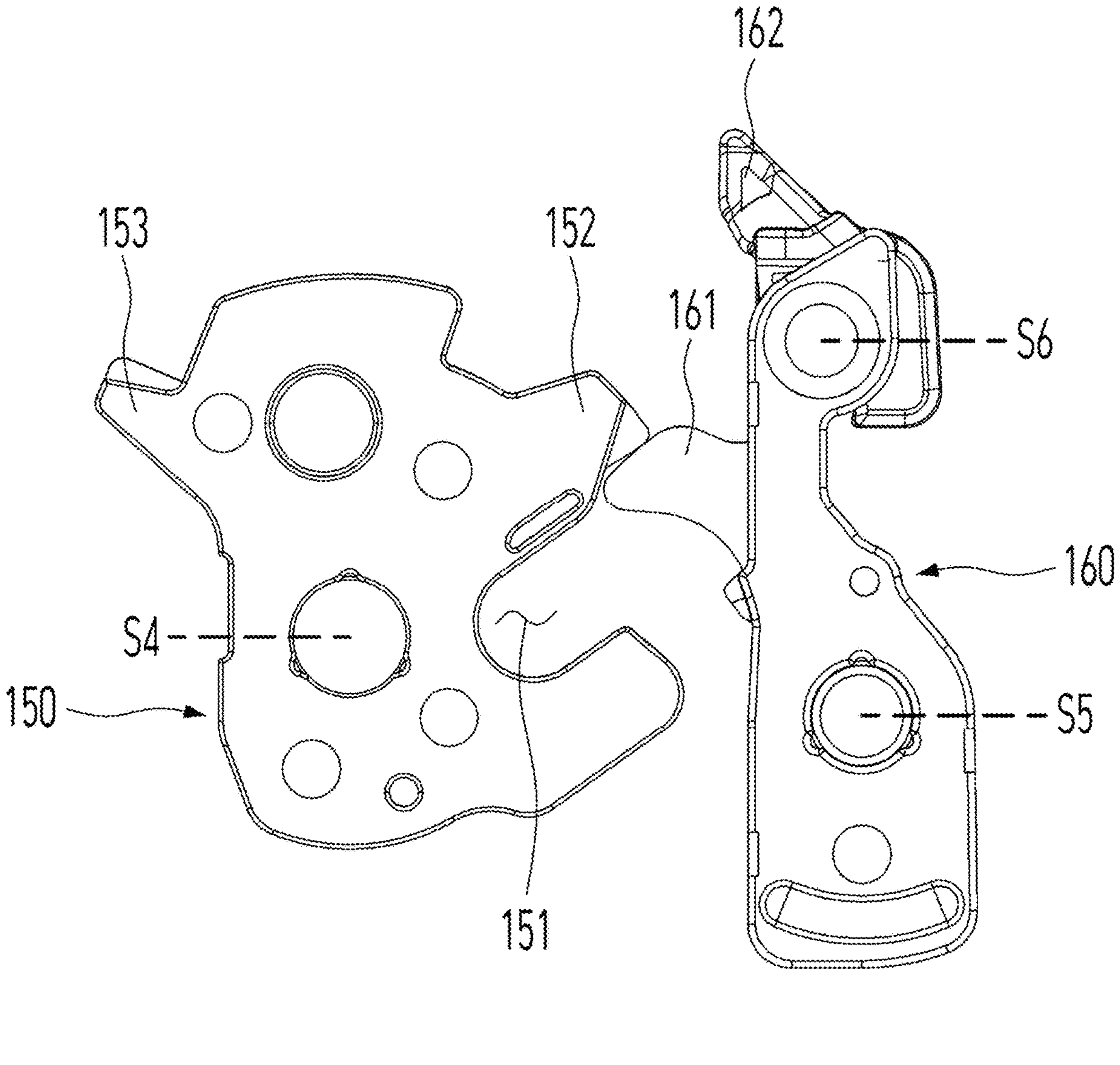
FIG. 6 is an enlarged view illustrating a catch and a pawl illustrated in FIG. 1.

FIG. 6 is an enlarged view illustrating the catch and the pawl illustrated in FIG. 1.

Further referring to FIG. 6, the catch 150 may be formed as a member having a unique shape, restrict the striker S disposed in the vehicle body, and release the striker S from the restriction. That is, the catch 150 may be disposed to lock and unlock the vehicle door. Specifically, the catch 150 may be contact-supported by the pawl 160 to control rotation of the catch 150. The catch 150 may be rotated about the catch rotary shaft S4 to restrict the striker S and release the striker S from the restriction.

Specifically, the catch 150 may include a fastener 151 for restricting the striker S, a first protruding step 152 which contact-supports the pawl 160, and a second protruding step 153 which contact-supports the cinching pin 143*a*.

The fastener 151 may be formed as a groove which is disposed at one side of the catch 150 and into which the striker S is inserted. Specifically, the fastener 151 may be formed in a hook shape on which the striker S is hooked so that the striker S may be restricted. The fastener 151 may be rotated according to rotation of the catch 150 to restrict the striker S and release the striker S from the restriction so that the door may be locked and unlocked. Preferably, the fastener 151 may be disposed in a lower end of the catch 150.

The first protruding step 152 may be disposed to protrude from one side of the catch 150 and may be contact-supported by a contact protrusion 161 of the pawl 160 which will be described below. Specifically, the first protruding step 152 may be disposed in a direction (at a right side of the catch 150) in which the pawl 160 is disposed and may be in contact with the contact protrusion 161 of the pawl 160.

The second protruding step 153 may be disposed to protrude from one side of the catch 150 and may contact-support the cinching pin 143*a* of the link part 140. Specifically, the second protruding step 153 may be disposed at a left side of the catch 150 and may be in contact with the cinching pin 143*a* to guide the catch 150 not to rotate at a high speed.

Meanwhile, the pawl 160 may be rotatably disposed at one side of the catch 150 and may be in contact with one side of the catch 150 to restrict rotation of the catch 150. Specifically, the pawl 160 may contact-support the catch 150 such that the catch 150 is not rotated to maintain a locked state of the vehicle latch 100. Then, when the vehicle latch 100 is released from the locked state, the pawl 160 may be released from contact with the catch 150 to release the locked state. The pawl 160 may rotate about the pawl rotary shaft S5.

Specifically, the pawl 160 may include the contact protrusion 161 which is contact-supported by the catch 150 and a pawl lever 162 in contact with the release part 121 of the worm gear 120.

The contact protrusion 161 may be disposed to protrude from one side of the pawl 160 and may be in contact with the first protruding step 152 of the catch 150. That is, the contact protrusion 161 may protrude in the direction in which the catch 150 is disposed, may be in selectively contact with and may be supported by the catch 150, and may allow the catch 150 to maintain the locked state.

The pawl lever 162 may be hinge-coupled to an upper end of the pawl 160 and disposed on a rotary path of the release part 121. The pawl lever 162 may selectively move along and come into contact with the outer circumference of the release part 121 in a hinge manner. Specifically, the pawl lever 162 may rotate the pawl 160 to press or not press the catch 150 according to a change in width when the release part 121 rotates. The pawl lever 162 may rotate in only a direction in which the pawl 160 is cinched (locked) without rotating in a direction in which the pawl 160 is released (opened).

That is, when the worm gear 120 rotates in a release direction, the pawl lever 162 may be hooked on the release part 121, and the pawl 160 may be rotated in the release direction. Conversely, when the worm gear 120 rotates in a cinching direction, the pawl lever 162 may come into contact with the release part 121. However, only the pawl lever 162 rotates about a pawl lever rotary shaft S6, and the pawl 160 does not rotate.

Figure 7A:
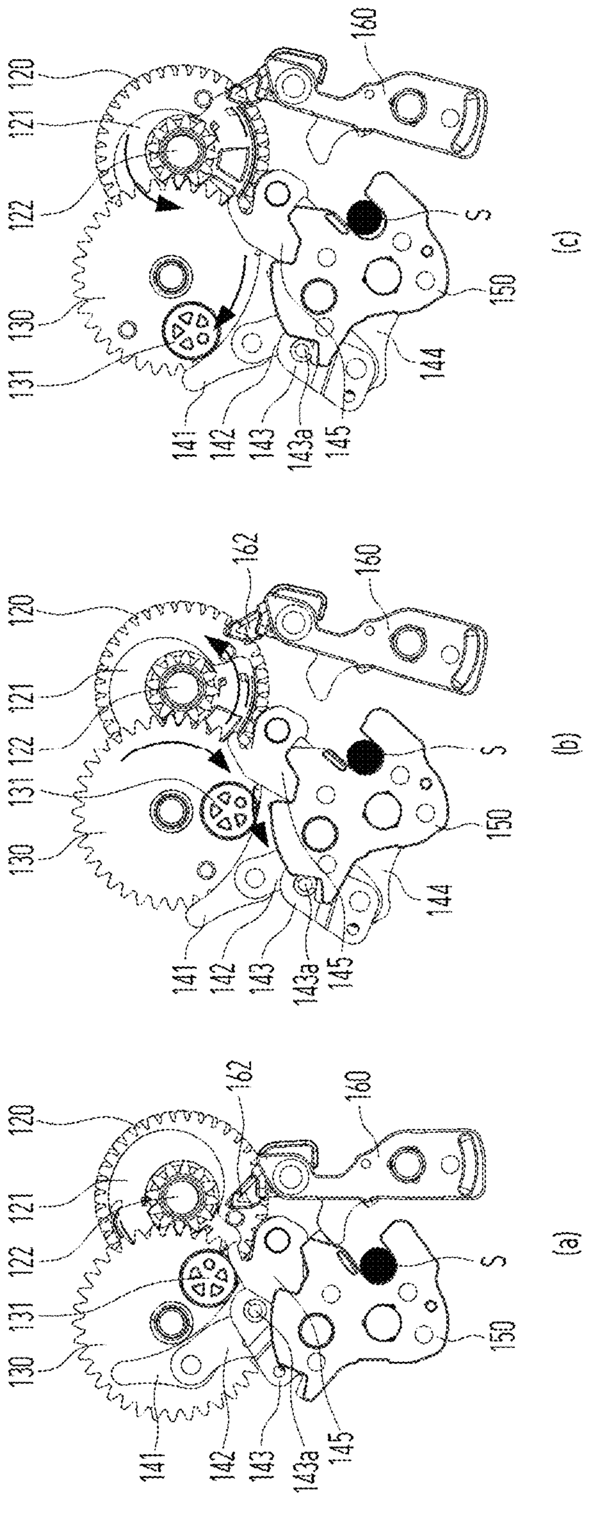
FIGS. 7A and 7B are views illustrating operational states of the vehicle latch with adjustable opening speed illustrated in FIG. 1.
Figure 7B:
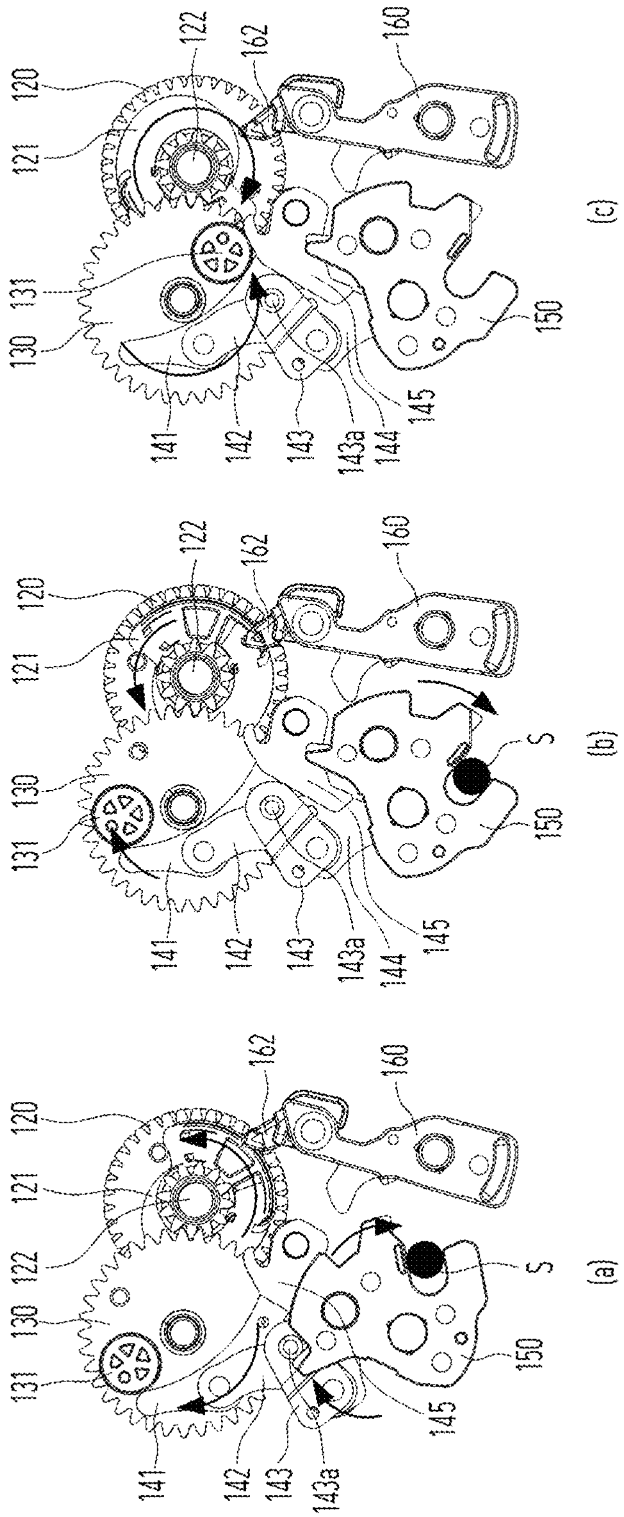

FIGS. 7A and 7B are views illustrating operational states of the vehicle latch with adjustable opening speed illustrated in FIG. 1.

An operation process of the vehicle latch 100 will be described with reference to FIGS. 7A to 7B. First, FIG. 7AA is a view illustrating the vehicle latch 100 in the second locked state, FIG. 7AB is a view illustrating a state in which the motor 110 operates to a predetermined extent so that the cinching pin 143*a* is in contact with the catch 150, and FIG. 7AC is a view illustrating a state in which the motor 110 operates further than FIG. 7AB.

First, referring to FIG. 7AA, the second locked state in which the catch 150 and the pawl 160 are contact-supported by each other and restrict the striker S is illustrated. In this case, the protrusion 131 is in contact with a right lower end of the first link part 141, and the cinching pin 143*a* maintains a state of not being in contact with the catch 150.

Then, referring to FIG. 7AB, the motor 110 may operate, the pawl 160 may come into contact with the release part 121 of the worm gear 120 and rotates, and contact between the catch 150 and the pawl 160 may be released. In this case, in the conventional case, a catch 150 may immediately rotate in a direction in which the pawl 160 is disposed and may come into contact with the pawl 160, and noise may be generated.

However, in the case of the present disclosure, the protrusion 131 may contact-move to near the center of the first link part 141 to rotate the first link part 141 downward to a predetermined extent. Accordingly, the cinching pin 143*a* may come into contact with may be supported by the second protruding step 153 of the catch 150. That is, the cinching pin 143*a* may prevent the catch 150 from immediately rotating in the direction in which the pawl 160 is disposed. In this case, rotation of the catch 150 may be temporarily stopped by the cinching pin 143*a*, and the catch 150 may rotate slowly according to operation of the motor 110.

Then, referring to FIG. 7AC, the motor 110 operates further, and the protrusion 131 may be contact-supported by a left upper end of the first link part 141. Since the pawl 160 is in a state of continuously being in contact with a large area portion of the release part 121, the pawl 160 may continuously maintain a state of being rotated in a right direction without being in contact with the catch 150. The cinching pin 143*a* may be in contact with the catch 150, and the catch 150 may continuously maintain a state of not being in contact with the pawl 160.

In addition, FIG. 7BA is a view illustrating the vehicle latch 100 in the first locked state in which the motor 110 operates further from FIG. 7AC, FIG. 7BB is a view illustrating a state in which the vehicle latch 100 is completely released from a locked state so that withdrawal of the striker S is performed, and FIG. 7BC is a view illustrating a state in which the vehicle latch 100 returns to an initial position.

Referring to FIG. 7BA, the motor 110 may operate further, and the protrusion 131 may move upward further when compared to FIG. 7AC. Even in this case, the protrusion 131 may maintain a state of being in contact with the left upper end of the first link part 141, and the first link part 141 may rotate upward more than FIG. 7AC. Accordingly, the cinching pin 143*a* may be lifted upward along an upper surface of the upward support 145, and a position of the cinching pin 143*a* may be moved upward by a predetermined extent. Accordingly, the catch 150 in contact with the cinching pin 143*a* is also rotated by a predetermined extent in the direction in which the pawl 160 is disposed. In this case, the catch 150 rotates slowly according to a speed at which the protrusion 131 rotates without rotating at a high speed. As described above, the catch 150 is rotated by the predetermined extent, and the vehicle latch 100 is changed into the first locked state.

Then, referring to FIG. 7BB, the motor 110 operates further, the protrusion 131 rotates further and is released from contact with the first link part 141. In this case, the cinching pin 143*a* is released from contact with the catch 150, the catch 150 is completely rotated to release the striker S from restriction, and the vehicle latch 100 is changed into the open state.

Finally, referring to FIG. 7BC, the motor 110 may operate further, the protrusion 131 may come into contact with the right lower end of the first link part 141 again after rotating completely. The pawl 160 is disposed on a smallest area portion of the release part 121, and the pawl 160 rotates again in the direction in which the catch 150 is disposed. That is, the vehicle latch 100 returns to the initial position in a state in which the striker S is not restricted.

As described above, in the vehicle latch 100 according to the embodiments of the present disclosure, since a speed at which the catch 150 is opened can be adjusted, there is an effect of suppressing opening noise generation of the tailgate. Specifically, in the vehicle latch 100 of the present disclosure, even when the pawl 160 releases the catch 150 from restriction, the catch 150 is not immediately rotated and opened. In the vehicle latch 100 of the present disclosure, the catch 150 can be rotated and opened at a lower speed than the conventional latch due to a rotational speed of the cinching gear 130. Accordingly, even when the catch 150 and the pawl 160 come into contact with each other, since a contact force is not strong and weaker than the conventional latch, noise generation can be suppressed.

In addition, in the vehicle latch 100 according to embodiments of the present disclosure, even when a reaction force of the vehicle is high, tailgate opening noise generation can be suppressed compared to the conventional case. Accordingly, in the vehicle latch 100 of the present disclosure, since the reaction force of the vehicle can be increased, noise such as traveling sound, vibration sound, and rattle sound can be suppressed.

Specifically, in the conventional vehicle latch, since tailgate opening noise is largely generated due to a reaction force of a vehicle, the reaction force of the vehicle should be decreased. However, in the vehicle latch 100 of the present disclosure, since tailgate opening noise generation is suppressed, a reaction force of the vehicle can be increased. That is, in the vehicle latch 100 of the present disclosure, as the reaction force of the vehicle is increased, since the transmission of noise such as traveling sound, vibration sound, and rattle sound transmitted to a user is suppressed, there is an effect of improving indoor quietness of the vehicle.

Since a vehicle latch according to embodiments of the present disclosure can adjust an opening speed of a catch, there is an effect of suppressing opening noise generation of a tailgate. Specifically, in the vehicle latch of the present disclosure, even when a pawl releases a catch from restriction, the catch is not rotated and opened immediately. In the vehicle latch of the present disclosure, the catch can be rotated and opened at a lower speed than the conventional latch due to a rotational speed of a cinching gear. Accordingly, even when the catch comes into contact with the pawl, since the catch does not strongly come into contact with the pawl and weakly comes into contact with the pawl, noise generation can be suppressed.

In addition, in a vehicle latch according to the embodiments of the present disclosure, even when a reaction force of a vehicle is high, tailgate opening noise generation can be suppressed compared to the conventional latch. Accordingly, in the vehicle latch of the present disclosure, since the reaction force of the vehicle can be increased compared to the conventional latch, noise such as traveling sound, vibration sound, and rattle sound generated while a vehicle travels can be suppressed.

Specifically, in the conventional vehicle latch, since loud tailgate opening noise is generated by a reaction force of a vehicle, the reaction force of the vehicle is lowered. However, in the vehicle latch of the present disclosure, since tailgate opening noise generation is suppressed, a reaction force of the vehicle can be increased. That is, in the vehicle latch of the present disclosure, as the reaction force of the vehicle is increased, since the transmission of noise such as traveling sound, vibration sound, and rattle sound transmitted to a user is suppressed, there is an effect of improving indoor quietness of the vehicle.

However, technical effects that can be obtained through the embodiments of the present disclosure are not necessarily limited to the above-described effects. Other technical effects that are not described above may be clearly understood by those skilled in the art to which the present disclosure belongs from the other descriptions of the specification such as the detailed description.

While embodiments of the present disclosure have been described above, the present disclosure may be variously modified and changed by those skilled in the art by adding, changing, or removing components without departing from the spirit of the present disclosure appended in the claims, and these also fall within the scope of the present disclosure.

What is claimed is:

1. A vehicle latch comprising:

a catch which restricts or releases a striker disposed in a vehicle body;

a pawl which comes into contact with one side of the catch to restrict rotation of the catch;

a motor which transmits power to a link part;

a worm gear engaged with the motor and rotated by operation of the motor; and a cinching gear that is engaged with the worm gear, rotates in a direction opposite to that of the worm gear, and includes a protrusion formed to protrude from a front surface of the cinching gear;

wherein the link part includes a first side that is in contact with the protrusion and another side that is in contact with the catch to allow the catch to be rotated by rotation of the protrusion;

wherein, in a process in which the catch is rotated such that a locked state is changed to an open state, the link part is contact-supported by one side of the catch, the catch is rotated by movement of the link part, and tailgate opening noise generation is suppressed; and wherein the worm gear includes a release part which is formed such that a central portion of the worm gear protrudes in a forward direction, is disposed to radially protrude from a center of the worm gear, and is formed to protrude gradually away from the center of the worm gear, and of which an outer circumference comes into contact with the pawl.

2. The vehicle latch of claim 1, wherein:

the link part includes a first link part, a second link part, a third link part, and a fourth link part; and the first link part, the second link part, the third link part, and the fourth link part are provided sequentially, are operated according to rotation of the motor, and contact-support the catch from a first locked state to a lock release state.

3. The vehicle latch of claim 1, wherein the link part includes a first link part which is in contact with the protrusion, is rotated about a third rotary shaft by rotation of the protrusion, and changes an arrangement angle of a second link part connected to the first link part.

4. The vehicle latch of claim 1, wherein the link part includes a third link part which includes a cinching pin formed to protrude from a front surface thereof and affects a speed at which the catch rotates by the cinching pin contact-supporting the catch when a second locked state of the catch is changed to a first locked state.

5. The vehicle latch of claim 4, wherein the cinching pin contact-supports the catch to rotate the catch according to a movement speed of the cinching pin when the second locked state of the catch is changed to the first locked state.

6. The vehicle latch of claim 1, wherein the link part includes an upward support in which a cinching pin, which is contact-supported by the catch, moves along an upper outer circumference of the upward support to release the cinching pin in contact with the catch when a first locked state of the catch is changed to an open state.

7. The vehicle latch of claim 1, wherein the pawl includes a pawl lever that is disposed on a rotary path of the release part protruding from the worm gear and rotates in only a direction in which the pawl is locked without rotating in a direction in which the pawl is opened.

8. The vehicle latch of claim 1, wherein the catch includes:

a first protruding step which contact-supports a contact protrusion of the pawl; and a second protruding step which contact-supports a cinching pin of the link part and guides rotation of the catch.

9. The vehicle latch of claim 1, wherein the release part includes a multi-end portion in which steps are formed in a stepped manner on one side of the worm gear and come into contact with the pawl to rotate the pawl in an opening direction in an opening process.

10. The vehicle latch of claim 1, wherein the catch rotates in a locking direction, and then rotates in an opening direction in a release process.

11. A vehicle latch comprising:

a catch configured to restrict or release a striker disposed in a vehicle body;

a pawl configured to come into contact with one side of the catch to restrict rotation of the catch;

a link part;

a motor configured to transmit power to the link part;

a worm gear engaged with the motor so as to be able to be rotated by operation of the motor; and a cinching gear that is engaged with the worm gear and is configured to rotate in a direction opposite to that of the worm gear, the cinching gear including a protrusion formed to protrude from a front surface of the cinching gear;

wherein the link part includes one side that is in contact with the protrusion and another side that is in contact with the catch to allow the catch to be rotated by rotation of the protrusion;

wherein, in a process in which the catch is rotated such that a locked state is changed to an open state, the link part is contact-supported by one side of the catch, the catch is rotated by movement of the link part, and tailgate opening noise generation is suppressed; and wherein the worm gear includes a release part which is formed such that a central portion of the worm gear protrudes in a forward direction, is disposed to radially protrude from a center of the worm gear, and is formed to protrude gradually away from the center of the worm gear.

12. The vehicle latch of claim 11, wherein:

the link part includes a first link part, a second link part, a third link part, and a fourth link part; and the first link part, the second link part, the third link part, and the fourth link part are provided sequentially, are configured to be operated according to rotation of the motor, and contact-support the catch from a first locked state to a lock release state.

13. The vehicle latch of claim 11, wherein the link part includes a first link part that is in contact with the protrusion, is configured to be rotated about a third rotary shaft by rotation of the protrusion, and is configured to change an arrangement angle of a second link part connected to the first link part.

14. The vehicle latch of claim 11, wherein the link part includes a third link part that includes a cinching pin that protrudes from a front surface thereof and is configured to affect a speed at which the catch rotates by the cinching pin contact-supporting the catch when a second locked state of the catch is changed to a first locked state.

15. The vehicle latch of claim 14, wherein the cinching pin contact-supports the catch so as to rotate the catch according to a movement speed of the cinching pin when the second locked state of the catch is changed to the first locked state.

16. The vehicle latch of claim 11, wherein the link part includes an upward support in which a cinching pin, which is contact-supported by the catch, is configured to move along an upper outer circumference of the upward support to release the cinching pin in contact with the catch when a first locked state of the catch is changed to an open state.

17. The vehicle latch of claim 11, wherein the pawl includes a pawl lever that is disposed on a rotary path of the release part protruding from the worm gear and is configured to rotate in only a direction in which the pawl is locked without rotating in a direction in which the pawl is opened.

18. The vehicle latch of claim 11, wherein the catch includes:

a first protruding step that contact-supports a contact protrusion of the pawl; and a second protruding step that contact-supports a cinching pin of the link part and is configured to guide rotation of the catch.

19. The vehicle latch of claim 11, wherein the release part includes a multi-end portion in which steps are formed in a stepped manner on one side of the worm gear and come into contact with the pawl to be able to rotate the pawl in an opening direction in an opening process.

20. A vehicle latch comprising:

a catch configured to restrict or release a striker disposed in a vehicle body;

a pawl configured to come into contact with one side of the catch to restrict rotation of the catch;

a link part;

a motor configured to transmit power to the link part;

a worm gear engaged with the motor so as to be able to be rotated by operation of the motor; and a cinching gear that is engaged with the worm gear and is configured to rotate in a direction opposite to that of the worm gear, the cinching gear including a protrusion formed to protrude from a front surface of the cinching gear;

wherein the link part includes one side that is in contact with the protrusion and another side that is in contact with the catch to allow the catch to be rotated by rotation of the protrusion;

wherein, in a process in which the catch is rotated such that a locked state is changed to an open state, the link part is contact-supported by one side of the catch, the catch is rotated by movement of the link part, and tailgate opening noise generation is suppressed;

wherein the worm gear includes a release part which is formed such that a central portion of the worm gear protrudes in a forward direction, is disposed to radially protrude from a center of the worm gear, and is formed to protrude gradually away from the center of the worm gear, and of which an outer circumference comes into contact with the pawl; and wherein the worm gear includes a central gear which is formed such that a central portion of the release part protrudes and of which an outer circumference is formed with sawteeth so that the cinching gear is engaged with the central gear.

* * * * *